US008411129B2

(12) United States Patent
Satterlee et al.

(10) Patent No.: US 8,411,129 B2
(45) Date of Patent: Apr. 2, 2013

(54) VIDEO CONFERENCE SYSTEM AND METHOD USING MULTICAST AND UNICAST TRANSMISSIONS

(75) Inventors: Michael Satterlee, Clifton Park, NY (US); Jamil Cheikhali, Tampa, FL (US); John F. Gibbons, Ballston Lake, NY (US); Neal A. Shackleton, Tierra Verde, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 608 days.

(21) Appl. No.: 12/636,919

(22) Filed: Dec. 14, 2009

(65) Prior Publication Data
US 2011/0141221 A1 Jun. 16, 2011

(51) Int. Cl.
*H04N 7/14* (2006.01)
*H04L 12/24* (2006.01)
*G06F 15/16* (2006.01)

(52) U.S. Cl. ............. 348/14.08; 348/14.09; 348/14.1; 348/14.11; 370/235; 370/260; 370/390; 370/395.1; 370/401; 380/277; 709/204; 709/223; 709/227; 709/230; 709/238; 714/6.31

(58) Field of Classification Search ............ 348/14.08, 348/14.09, 14.1, 14.11; 370/228, 235, 260, 370/261, 352, 389, 390, 400, 401, 222, 395.1; 380/277; 709/204, 222, 226, 229, 230, 231, 709/238, 223, 227, 256, 311; 714/631, 6.31
See application file for complete search history.

(56) References Cited

U.S. PATENT DOCUMENTS

| | | | | | |
|---|---|---|---|---|---|
| 5,473,367 | A | * | 12/1995 | Bales et al. | 348/14.11 |
| 5,592,478 | A | * | 1/1997 | Weiss | 370/260 |
| 5,764,278 | A | * | 6/1998 | Nagao | 348/14.1 |
| 6,088,732 | A | * | 7/2000 | Smith et al. | 709/229 |
| 6,404,745 | B1 | | 6/2002 | O'Neil et al. | |
| 6,502,140 | B1 | * | 12/2002 | Boivie | 709/238 |
| 6,856,603 | B1 | * | 2/2005 | Vollmer et al. | 370/311 |
| 6,948,088 | B1 | * | 9/2005 | Sharan | 714/6.31 |
| 7,043,528 | B2 | * | 5/2006 | Schmitt et al. | 709/204 |
| 7,075,919 | B1 | * | 7/2006 | Wendt et al. | 370/352 |
| 7,079,495 | B1 | | 7/2006 | Pearce et al. | |
| 7,113,992 | B1 | * | 9/2006 | Even | 709/227 |
| 7,194,002 | B2 | * | 3/2007 | Zhang et al. | 370/400 |
| 7,391,724 | B2 | * | 6/2008 | Alakoski et al. | 370/230 |
| 7,551,573 | B2 | * | 6/2009 | Baird et al. | 370/260 |
| 7,640,301 | B2 | * | 12/2009 | Walter | 709/204 |
| 7,664,056 | B2 | * | 2/2010 | Dye et al. | 370/260 |
| 7,826,348 | B2 | * | 11/2010 | Farinacci et al. | 370/228 |
| 7,830,802 | B2 | * | 11/2010 | Huang et al. | 370/235 |
| 7,830,822 | B2 | * | 11/2010 | Boers et al. | 370/256 |
| 7,864,961 | B2 | * | 1/2011 | Won et al. | 380/277 |
| 7,965,717 | B2 | * | 6/2011 | Mistry et al. | 370/395.1 |

(Continued)

*Primary Examiner* — Gerald Gauthier
(74) *Attorney, Agent, or Firm* — Toler Law Group, PC

(57) ABSTRACT

A computer-implemented method includes receiving registration messages at a call control agent device via first unicast transmissions from at least three video conference terminals. The registration messages request set up of a video conference between the at least three video conference terminals. The computer-implemented method includes sending a set up message from the call control agent device to each of the at least three conference terminals via second unicast transmissions. The set up message includes at least an identification of a multicast control group, a send multicast group of each of the at least three conference terminals, and a default receive multicast group. In response to the set up message, one or more of the at least three video conference terminals join the default receive multicast group.

20 Claims, 8 Drawing Sheets

U.S. PATENT DOCUMENTS

| | | | |
|---|---|---|---|
| 7,984,174 B2* | 7/2011 | Rideout | 709/231 |
| 8,107,403 B2* | 1/2012 | Barave et al. | 370/260 |
| 8,144,631 B2* | 3/2012 | Zhang et al. | 370/261 |
| 8,179,422 B2* | 5/2012 | Wu et al. | 348/14.09 |
| 8,184,628 B2* | 5/2012 | Cai et al. | 370/389 |
| 2005/0021725 A1* | 1/2005 | Lobbert | 709/223 |
| 2005/0132000 A1 | 6/2005 | Richardson et al. | |
| 2005/0207433 A1* | 9/2005 | Ni | 370/401 |
| 2007/0005804 A1 | 1/2007 | Rideout | |
| 2007/0014289 A1* | 1/2007 | Settle | 370/390 |
| 2009/0201803 A1* | 8/2009 | Filsfils et al. | 370/222 |
| 2009/0240811 A1* | 9/2009 | Wei et al. | 709/226 |
| 2010/0049860 A1* | 2/2010 | Kouvelas et al. | 709/230 |
| 2010/0177158 A1* | 7/2010 | Walter | 348/14.09 |
| 2010/0195651 A1* | 8/2010 | Dayong et al. | 370/390 |
| 2010/0260178 A1* | 10/2010 | Huang et al. | 370/390 |
| 2011/0141221 A1* | 6/2011 | Satterlee et al. | 348/14.08 |
| 2011/0221860 A1* | 9/2011 | Rideout | 348/14.09 |
| 2011/0242981 A1* | 10/2011 | Mistry et al. | 370/235 |
| 2012/0147127 A1* | 6/2012 | Satterlee et al. | 348/14.08 |

* cited by examiner

VIDEO CONFERENCE SYSTEM AND METHOD USING MULTICAST AND UNICAST TRANSMISSIONS

FIELD OF THE DISCLOSURE

The present disclosure is generally related to video conferencing using multicast and unicast transmissions.

BACKGROUND

When a service provider deploys a centralized video conferencing bridge to provide video conferencing services, video conference data from video conferencing terminals participating in a call may be sent to the centralized video conferencing bridge. The centralized video conferencing bridge may send select video conference data to the video conferencing terminals participating in the call. Such a centralized architecture may be inefficient because the video conference data from each of the video conferencing terminals participating in the call may be processed by the centralized video conferencing bridge. For example, when a video conference call uses fifteen megabytes per video conference terminal, a video conference involving three video conference terminals may use forty-five megabytes of bandwidth at the centralized video conferencing bridge to support the call. In addition to having large bandwidth requirements, a centralized video conferencing architecture may not scale easily and may have issues with service availability (e.g., due to a single point of failure).

DETAILED DESCRIPTION

Figure 1:
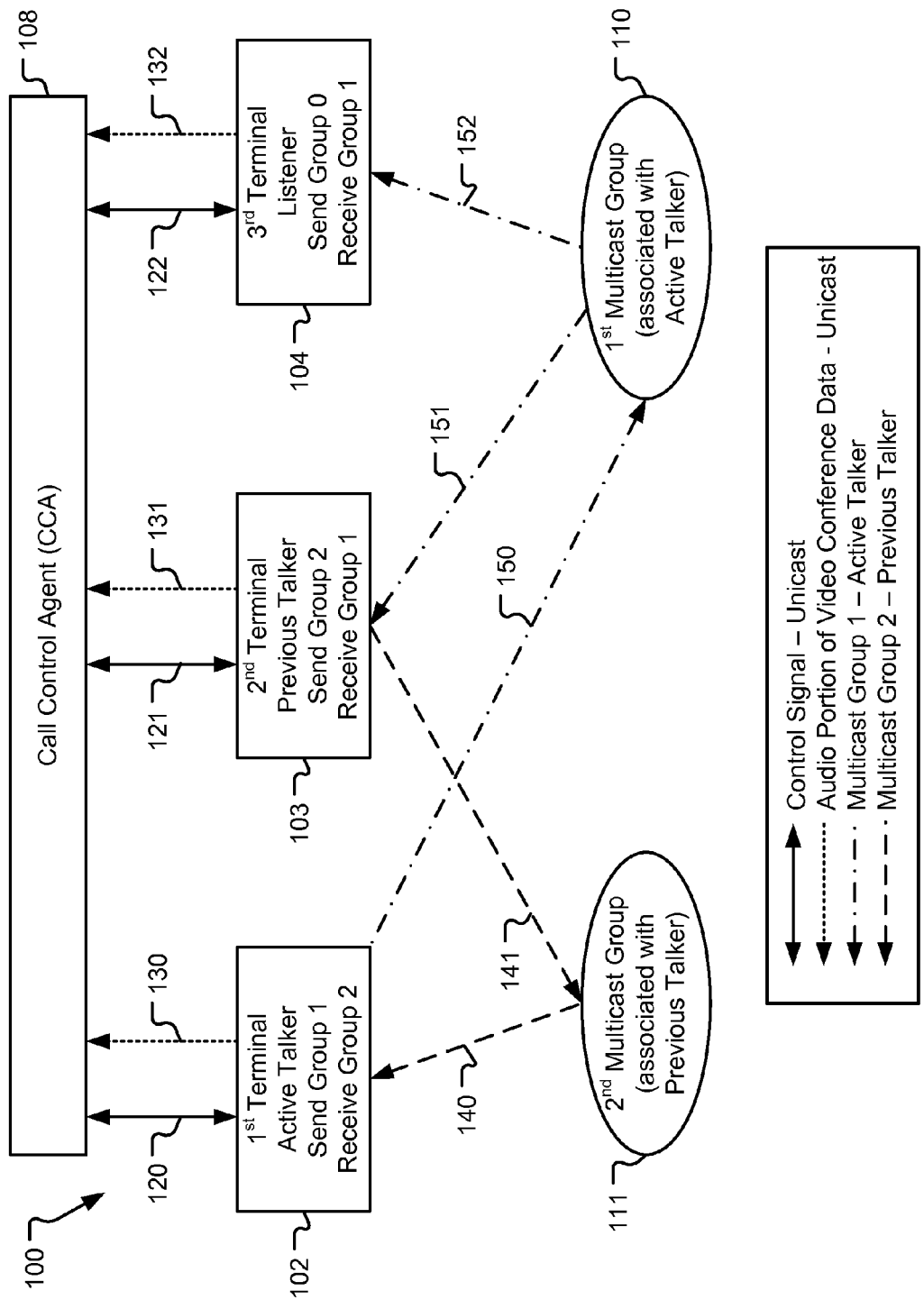
FIG. 1 is a block diagram of a first particular embodiment of a video conferencing system using multicast and unicast transmissions.

Registration messages are received at a call control agent device via first unicast transmissions from video conference terminals (e.g., three or more video conference terminals). The registration messages request set up of a video conference between the video conference terminals. A set up message is sent from the call control agent device to each of the video conference terminals via second unicast transmissions. The set up message includes an identification of a multicast control group, an identification of a send multicast group of each of the video conference terminals, and an identification of a default receive multicast group. In response to the set up message, one or more of the video conference terminals join the default receive multicast group.

In a particular embodiment, a computer-implemented method includes receiving registration messages at a call control agent device via first unicast transmissions from video conference terminals (e.g., at least three video conference terminals). The registration messages request set up of a video conference between the video conference terminals. The computer-implemented method includes sending a set up message from the call control agent device to each of the video conference terminals via second unicast transmissions. The set up message includes an identification of a multicast control group, a send multicast group of each of the video conference terminals, and a default receive multicast group. In response to the set up message, one or more of the video conference terminals join the default receive multicast group.

In another particular embodiment, a computer-readable storage medium includes operational instructions that, when executed by a processor, cause the processor to send a registration message to a call control agent device via a first unicast transmission from a first video conference terminal. The registration message requests set up of a video conference between multiple terminals, such as the first video conference terminal, a second video conference terminal and a third video conference terminal. The operational instructions are further executable by the processor to receive a set up message at the first video conference terminal from the call control agent device via a second unicast transmission. The set up message includes an identification of a multicast control group, a first send multicast group assigned to the first video conference terminal, and a default receive multicast group. The operational instructions are further executable by the processor to join the default receive multicast group to receive incoming video conference data. The operational instructions are further executable by the processor to send outgoing video conference data from the first video conference terminal via the first send multicast group.

In another particular embodiment, a first video conferencing terminal includes a video camera to capture and to output outgoing video conference data. The first video conferencing terminal includes a display screen to display incoming video conference data. The first video conferencing terminal includes a microphone to capture and output audio output data. The first video conferencing terminal further includes a speaker. The first video conferencing terminal also includes a processor and a memory including operational instructions that, when executed by the processor, cause the processor to send the outgoing video conference data from the first video conference terminal to a first send multicast group. At least a second video conference terminal and a third video conference terminal receive the outgoing video conference data via the first send multicast group. The operational instructions are further executable by the processor to receive the incoming video conference data at the first video conference terminal via a multicast group associated with outgoing video conference data from the third video conference terminal.

Referring to FIG. 1, a block diagram of a first particular embodiment of a video conferencing system using multicast and unicast transmissions is depicted and generally designated 100. The system 100 includes a first terminal 102, a second terminal 103, and a third terminal 104 in communication with a Call Control Agent (CCA) 108. The system 100 illustrates how the terminals 102-104 register with the CCA 108. The system 100 may be scaled to accommodate more than the three terminals 102-104.

The terminals 102-104 may be video conferencing terminals located in geographically dispersed video conferencing locations. The terminals 102-104 may be coupled to or integrated with a video capture device (e.g., video camera), a video display device, an audio capture device (e.g., microphone), computing device, another conferencing-related device, or any combination thereof. To set up or join a video conference call, the terminals 102-104 may send requests to the CCA 108 to join the video conferencing call. The terminals 102-104 may communicate with the CCA 108 via a network (not shown). For example, the terminals 102-104 may send data packets, such as Internet Protocol (IP) data packets, to the CCA 108. The data packets may be sent via multicast or via unicast transmission. For example, IP multicast may be used for one-to-many communication over an IP infrastructure in a network. Multicast may use network infrastructure efficiently because a source sends a packet only once, even when sending to a large number of receivers. Nodes of the network may replicate the packet to reach multiple receivers only as needed.

The CCA 108 may be a software program executing on a central hardware server. The CCA 108 may monitor terminals participating in a video conference call, such as the terminals 102-104, determine an active talker terminal, and instruct the terminals to send video data to a particular multicast group or to receive video data from a particular multicast group based on the active talker terminal. A terminal may send video conference data to a multicast group and another terminal may monitor (e.g., receive) video conference data from that multicast group. When a terminal is instructed to send video conference data to a particular multicast group, the particular multicast group may be referred to as a send multicast group for that terminal. When a terminal is instructed to monitor (e.g., receive) video conference data via a particular multicast group, the particular multicast group may be referred to as a receive multicast group for that terminal. For example, when the CCA 108 instructs the first terminal 102 to send video conference data 150 to a first multicast group 110, the CCA 108 may assign the first multicast group 110 as the send multicast group of the first terminal 102. When the CCA 108 instructs the first terminal 102 to monitor video conference data 140 via the second multicast group 111, the CCA 108 may assign the second multicast group 111 as the receive multicast group of the first terminal 102.

In operation, after each of the terminals 102-104 is powered on, one or more of the terminals 102-104 may register with the CCA 108. The first terminal 102 may register with the CCA 108 via a first unicast control signal 120, the second terminal 103 may register with the CCA 108 via a second unicast control signal 121, and the third terminal 104 may register with the CCA 108 via a third unicast control signal 122. The CCA 108 may assign each of the terminals 102-104 to one of at least three possible roles (e.g., an Active Talker, a Previous Talker, and a Listener) based on the registration order of the terminals 102-104 or based on other factors, such as default roles assigned to the terminals 102-104. Additional roles may also be defined when additional Coder-DECoders (CODECs) and other features are made available. To illustrate, the CCA 108 may assign the first terminal 102 the role of Active Talker. The CCA 108 may assign the second terminal 103 the role of Previous Talker. The CCA 108 may assign the third terminal 104, and any other terminals registering after the second terminal 103 has registered, the role of Listener.

The CCA 108 may identify a particular multicast group and instruct each of the terminals 102-104 participating in the video conference call to send its video conference data to the particular multicast group. Note that the term "video conference data" in this disclosure may include video and audio corresponding to the video. The particular multicast group may be a multicast group to which one or more of the terminals 102-104 sends its video conference data (e.g., send multicast group). To illustrate, each of the terminals 102-104 may be assigned a separate multicast group to send its video conference data to. Additionally, the CCA 108 may identify a particular multicast group and instruct each of the terminals 102-104 to monitor (e.g., receive) video conference data from the particular multicast group (e.g., receive multicast group). The CCA 108 may instruct the first terminal 102 to send video conference data 150 to the first multicast group 110 and to monitor video conference data 140 from the second multicast group 111 (e.g., to monitor the Previous Talker). The CCA 108 may instruct the second terminal 103 to send video conference data 141 to the second multicast group 111 and to monitor video conference data 151 from the first multicast group 110 (e.g., to monitor the Active Talker). The CCA 108 may instruct the third terminal 103, and any subsequently registered terminals, to not send any video conference data (e.g., to send to group 0) and to monitor video conference data 152 from the first multicast group 110 (e.g., to monitor the Active Talker).

After registering with the CCA108, each of the terminals 102-104 may start sending an audio portion of its video conference data to the CCA 108 via unicast transmissions. For example, the first terminal 102 may send the audio portion of the video conference data 130 to the CCA 108 via a first unicast transmission. The second terminal 103 may send the audio portion of the video conference data 131 to the CCA 108 via a second unicast transmission. The third terminal 103 may send the audio portion of the video conference data 132 to the CCA 108 via a third unicast transmission. The CCA 108 may monitor the audio portions of the video conference data 130-132 to determine which of the terminals 102-104 is active (e.g., someone near the terminal is talking) For example, the CCA 108 may determine which of the terminals 102-104 is active based on a volume of the audio portion of the video conference data 103-132, a newest to talk (e.g., round robin), a spoken instruction, an electronic instruction, a talk request queue, another determination method, or any combination thereof. After determining which of the terminals 102-104 is active, the CCA 108 may instruct the terminals 102-104 to change roles via the unicast transmissions 120-122. For example, the CCA 108 may instruct each of the terminals 102-104 to change the multicast group that the terminal sends video conference data to or the CCA 108 may instruct each of the terminals 102-104 to change the multicast group the terminal receives video conference data from via the unicast transmissions 120-122. The unicast audio portion of the video conference data 130-132 may be used by the CCA 108 to determine which of the terminals 102-122 should be assigned the role of Active Talker.

During call setup, the first terminal 102 that registers with the CCA 108 may be assigned the role of Active Talker via the unicast transmission 120. The Active Talker may be instructed to monitor the second multicast group 111 (e.g., to monitor the Previous Talker) via a unicast transmission. Additionally, the Active Talker may send video conference data 150 to the first multicast group 110, which all of the other terminals 103-104 monitor by default. Thus, a terminal assigned the role of Active Talker (e.g., the first terminal 102 as illustrated in FIG. 1) may not receive video conference data from itself, but instead receives video conference data from the terminal assigned the role of Previous Talker (e.g., the second terminal 103 as illustrated in FIG. 1). The second terminal 103 that registers with the CCA 108 may be assigned the role of Previous Talker via the unicast transmission 121. The Previous Talker may send video conference data 141 to the second multicast group 111 (which the Active Talker monitors). The Previous Talker may monitor the first multicast group 110 (e.g., receive video conference data 151). All other terminals, i.e., any terminal that is not assigned the role of Active Talker or Previous Talker, may be assigned the role of Listener via unicast transmissions from the CCA 108. Any terminal assigned the role of Listener may not send any video conference data and monitors 152 to the Active Talker (e.g., the first terminal 102) via the first multicast group 110. Alternately, terminals assigned to the role of Listener may send video conference data to assigned multicast groups (not shown) that no terminal monitors.

Thus, by using the CCA 108 and the multicast groups 110-111, a centralized video conferencing bridge may not be required to conduct video conferencing calls. In addition, bandwidth requirements can be reduced by multicasting the video conference data. Multicasting enables efficient delivery of video conference data to multiple destinations because the video conference data is sent over each link in a network once and the video conference data is replicated only when the links to the multiple destinations split. An added benefit of multicasting is that multicasting scales to a large number of terminals by not requiring prior knowledge of how many terminals there are. Multicast utilizes network infrastructure efficiently by enabling a source terminal to send a packet (e.g., a packet including video conference data) only once, even when the packet is being delivered to a large number of other terminals. Nodes in the network (e.g., multicast nodes) replicate the packet to reach multiple terminals as needed. Thus, using multicasting to deliver video conference data for a video conference call between three or more terminals may result in a significant decrease in the amount of bandwidth used on the network (driving down the cost to deliver the service) as well as a reduction in latency for video conference calls.

Figure 2:
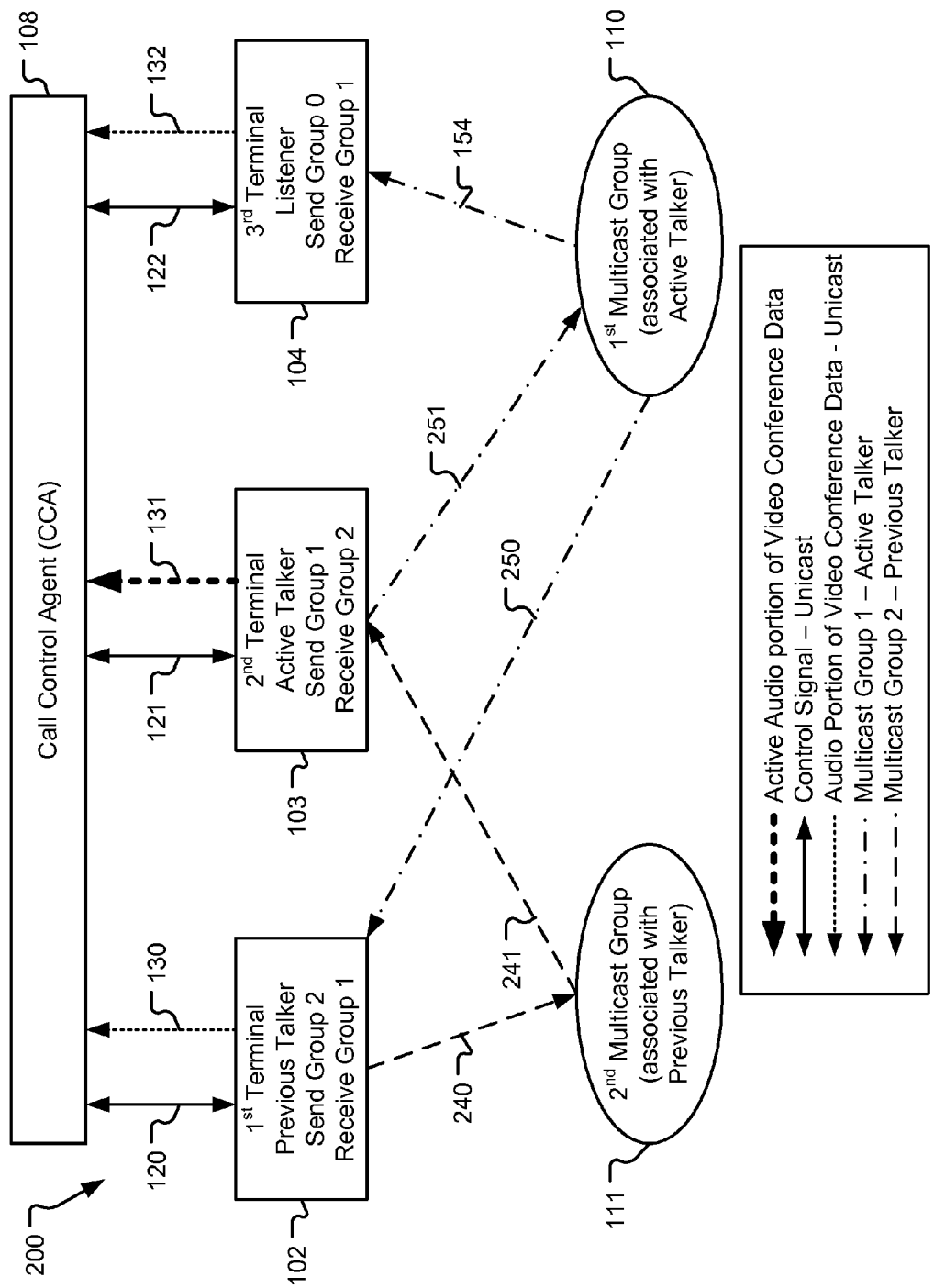
FIG. 2 is a block diagram of a second particular embodiment of a video conferencing system using multicast and unicast transmissions.

Referring to FIG. 2, a block diagram of a second particular embodiment of a video conferencing system using multicast and unicast transmissions is depicted and generally designated 200. The system 200 includes the first terminal 102, the second terminal 103, and the third terminal 104 in communication with the CCA 108. The system 200 illustrates changes to the video conferencing system 100 of FIG. 1 when a participant at the second terminal 103 begins talking and the second terminal 103 is assigned the role of Active Talker.

The CCA 108 monitors the unicast audio portion of the video conference data 130 from the first terminal 102, the unicast audio portion of the video conference data 131 from the second terminal 103, and the unicast audio portion of the video conference data 132 from the third terminal 104. When the CCA 108 determines that the unicast audio portion of the video conference data 131 is carrying the audio portion of the video conference data from the second terminal 103, the CCA 108 may determine that the second terminal 103 is active. In response, the CCA 108 may send a control message via the unicast transmission 120 instructing the first terminal 102 to change roles from Active Talker to Previous Talker. Thus, the first terminal 102 may send video conference data 240 to the second multicast group 111 and monitor video conference data 250 via the first multicast group 110. The CCA 108 may send a control message via the unicast control message 121 to the second terminal 103 to become the Active Talker. Thus, the second terminal 103 may send 251 to the first multicast group 110 and monitor 241 the second multicast group 111 (e.g., monitor the Previous Talker). The remaining terminals (e.g., the third terminal 104) may remain Listeners and continue to monitor video conference data 154 via the first multicast group 110. The result is that both the first terminal 102 and the third terminal 104 monitor video conference data 250, 154 from the second terminal 103 via the first multicast group 110 and the second terminal 103 monitors the video conference data 241 from the first terminal 102 via the second multicast group 111.

Thus, by using the CCA 108 and the multicast groups 110-111, a centralized video conferencing bridge may not be required for video conferencing calls. In addition, bandwidth requirements can be reduced by multicasting the video conference data. Thus, using multicasting to deliver video conference data of a video conference call between three or more terminals may result in a significant decrease in the amount of bandwidth used on the network (driving down the cost to deliver the service) as well as a reduction in latency for video conference calls.

Figure 3:
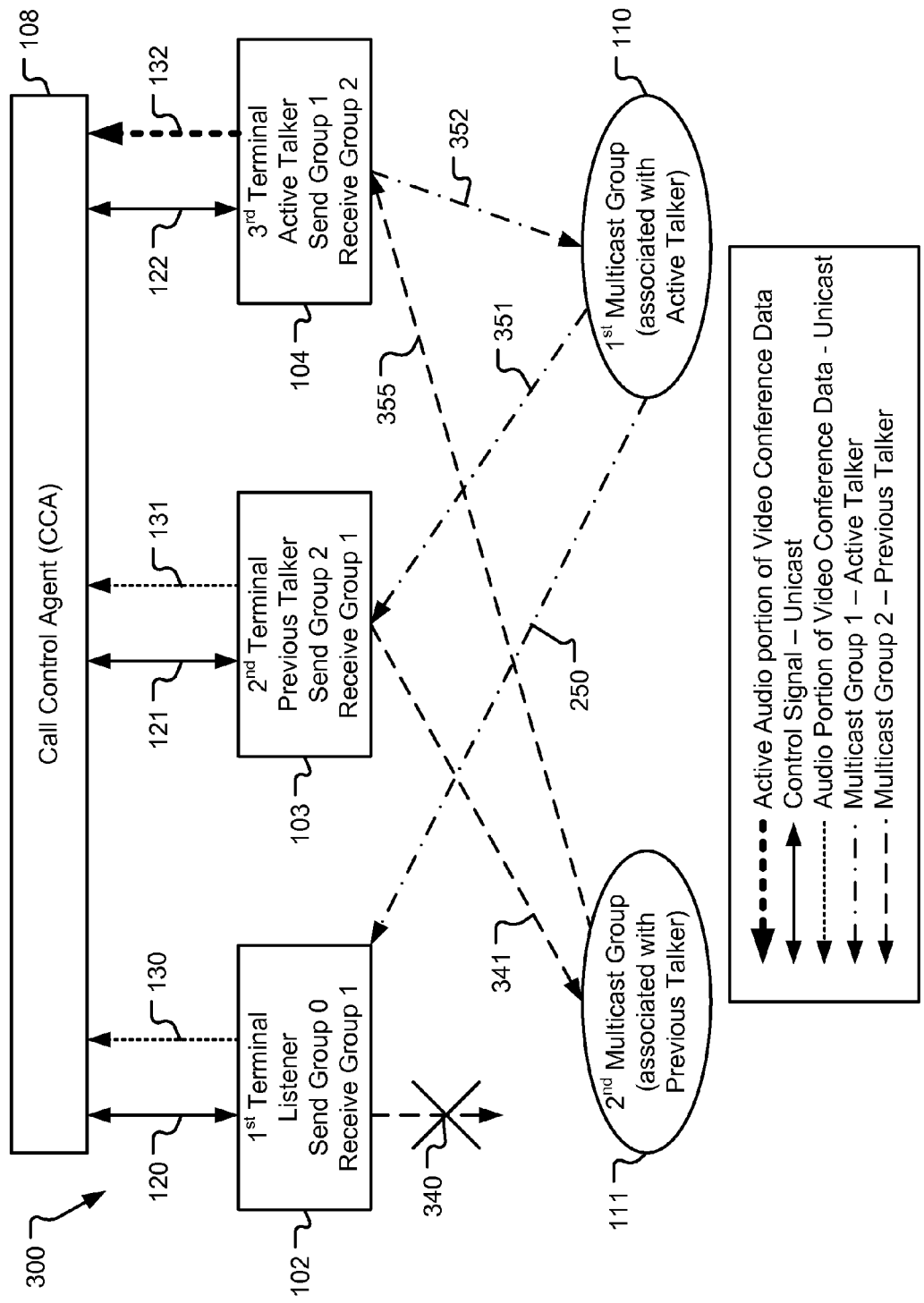
FIG. 3 is a block diagram of a third particular embodiment of a video conferencing system using multicast and unicast transmissions.

Referring to FIG. 3, a block diagram of a third particular embodiment of a video conferencing system using multicast and unicast transmissions is depicted and generally designated 300. The system 300 includes the first terminal 102, the second terminal 103, and the third terminal 104 in communication with the CCA 108. The system 300 illustrates changes to the video conferencing system 200 of FIG. 2 when a participant at the third terminal 104 begins talking and the third terminal 104 is assigned the role of Active Talker.

The CCA 108 may monitor the unicast audio portion of the video conference data 130-132 from the terminals 102-104 to determine which of the terminals 102-104 is active (e.g., to determine the Active Talker). The CCA 108 may determine that the third terminal 104 is active based on the unicast audio portion of the video conference data 132. In response, the CCA 108 may send a control message via the unicast transmission 121 instructing the second terminal 103 to change roles from Active Talker to Previous Talker. The second terminal 103 may send video conference data 341 to the second multicast group 111 and monitor video conference data 351 via the first multicast group 110. The CCA 108 may send a control message via the unicast transmission 121 to the third terminal 104 to assign the role of Active Talker. The third terminal 104 may send video conference data 352 to the first multicast group 110 and monitor the video conference data 355 via the second multicast group 111 (e.g., monitor the Previous Talker). The remaining terminals (e.g., the first terminal 102) may be instructed to remain Listeners and to continue to monitor video conference data 250 via the first multicast group 110 and to stop transmission of video conference data 340. The result is that both the first terminal 102 and the second terminal 104 monitor video conference data 250, 351 of the third terminal 104 via the first multicast group 110 and the third terminal 104 monitors the video conference data 355 of the second terminal 103 (the Previous Talker) via the second multicast group 111.

In a particular embodiment, unicast and multicast transmissions may be used in parallel to allow seamless switching from one Active Talker terminal to another Active Talker. The CCA 108 may send unicast video conference data (not shown) to one or more of the terminals 102-104 participating in the video conference call for a small period of time (e.g., milliseconds) when the terminals 102-104 begin monitoring the active multicast group. Once the terminals 102-104 begin monitoring the active multicast group, the CCA 108 may stop sending unicast packets to at least one of the terminals 102-

104. The terminals 102-104 may use information (e.g., frame number or time code) contained in the video conference data to synchronize between the unicast video conference data and the multicast video conference data and to determine when to switch from the unicast video conference data to the multicast video conference data.

Thus, by using the CCA 108 and the multicast groups 110-111, a centralized video conferencing bridge may not be required for video conferencing calls. In addition, bandwidth requirements can be reduced by multicasting the video conference data. Thus, using multicasting to deliver video conference data of a video conference call between three or more terminals may result in a significant decrease in the amount of bandwidth used on the network (driving down the cost to deliver the service) as well as a reduction in latency for video conference calls.

Figure 4:
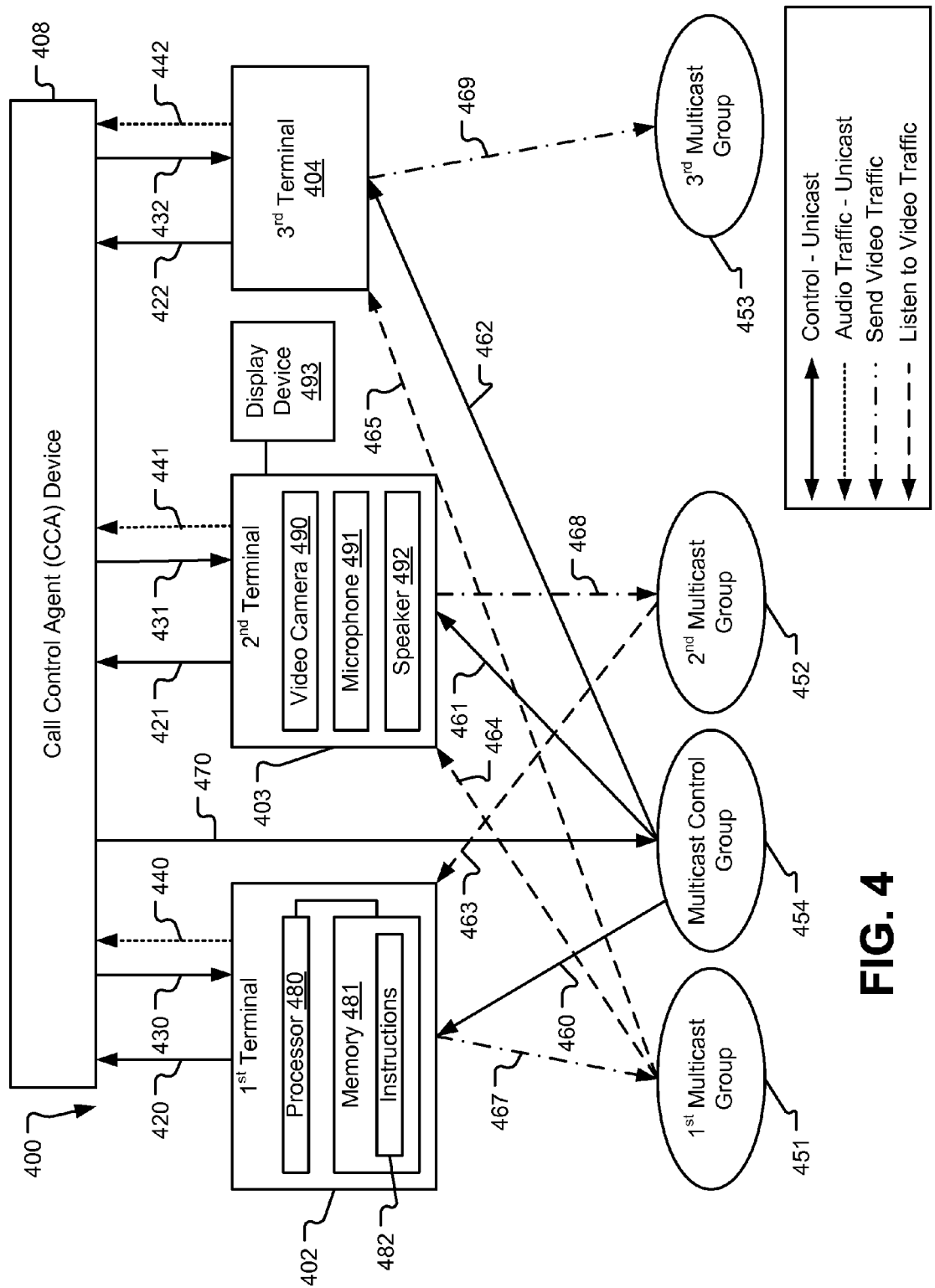
FIG. 4 is a block diagram of a fourth particular embodiment of a video conferencing system using multicast and unicast transmissions.

Referring to FIG. 4, a block diagram of a fourth particular embodiment of a video conferencing system using multicast and unicast transmissions is depicted and generally designated 400. The system 400 includes a first terminal 402, a second terminal 403, and a third terminal 404 in communication with a Call Control Agent (CCA) device 408.

The terminals 402-404 may be video conferencing terminals located in geographically dispersed video conferencing locations. To set up or join a video conference call, the terminals 402-404 may send requests to the CCA device 408 to set up or join the video conferencing call. The terminals 402-404 may communicate with the CCA device 408 via a network (not shown). For example, the terminals 402-404 may send data packets, such as Internet Protocol (IP) data packets, to the CCA 408. The data packets may be sent via multicast or via unicast transmission. At least one of the terminals, such as the first terminal 402, may include a processor 480 and a memory 481. The memory 481 may include operational instructions 482 that are executable by the processor 480 to perform the various functions of the terminal. At least one of the terminals, such as the second terminal 403, may be associated with or have integrated into the terminal one or more of a video camera 490, a microphone 491, a speaker 492, and a display device 493. To set up or join a video conference call, the terminals 402-404 may send requests to the CCA 408 to join the video conferencing call.

The CCA device 408 may be a specialized computer executing video conferencing software. The CCA device 408 may include specialized hardware, such as multiple networking ports, to enable to the CCA device 408 to provide video conferencing capabilities to a network. The CCA device 408 may monitor terminals participating in a video conference call, such as the terminals 402-404, determine which of the terminals is active (e.g., identify an Active Talker), and instruct the terminals to monitor a particular multicast group based on the Active Talker.

In operation, each of the terminals 402-404 may register with the CCA device 408 via unicast transmissions to request the CCA device 408 to set up a video conference call between the terminals 402-404. For example, the first terminal 402 may register with the CCA device 408 by sending a registration control message 420 to the CCA device 408. The second terminal 403 may register with the CCA device 408 by sending a registration control message 421 to the CCA device 408. The third terminal 404 may register with the CCA device 408 by sending a registration control message 422 to the CCA device 408.

The CCA device 408 may send instructions, via unicast transmissions to each of the terminals 402-404. The instructions may direct the terminals 402-404 to join a control multicast group, to send video conference data to an assigned multicast group, and to receive video conference data from another assigned multicast group. Each of the terminals 402-404 may have an associated send multicast group to which the terminal sends video conference data. For example, the CCA device 408 may send an instruction control message 430 instructing the first terminal 402 to join (e.g., monitor 460) a multicast control group 454, to send 467 to a first multicast group 451, and to monitor 463 a second multicast group 452. The CCA device 408 may send an instruction control message 431 instructing the second terminal 403 to join (e.g., monitor 461) the multicast control group 454, to send 468 to the second multicast group 452, and to monitor 464 the first multicast group 451 (i.e., the send multicast group of the first terminal 402). The CCA device 408 may send an instruction control message 432 instructing the third terminal 403 to join (e.g., to receive control messages via) the multicast control group 454, to send video conference data 469 to the third multicast group 453, and to monitor video conference data 465 via the first multicast group 451 (i.e., the send multicast group of the first terminal 402).

When the video conferencing call is initiated, the first terminal 402 may be assigned the role of Active Talker and may monitor video conference data 460 via the multicast control group 454 and may monitor video conference data 461 via the next highest multicast group (e.g., the second multicast group 452). This is done so that the Active Talker terminal does not sees its own video conference data. The second and third terminals 403-404 may monitor 464-465 the first multicast group 451 associated with the first terminal 402. In this example, the first multicast group 451 may be known as the default receive multicast group because all terminals other than the Active Talker monitor the first multicast group 451.

An audio portion of the video conference data 440-442 may be sent from the terminals 402-404 to the CCA device 408 via unicast transmission. The CCA device 408 may send the audio portion of the video conference data 440-442 to all participant terminals in the video conference call. Alternately, the video conference data 440-442 may include the audio portion of the video conference data 440-442. The CCA device 408 may monitor the audio portion of the video conference data 440-442 to determine which terminal is the Active Talker (e.g., someone near the terminal is talking) and may send a control message 470 to the multicast control group 454 instructing the other terminals to monitor the multicast group associated with the Active Talker (i.e., the send multicast group of the Active Talker). After the initial video conferencing call set up, terminals 402-404 may monitor the multicast control group 454. By sending the control message 470 to the multicast control group 454, the CCA device 408 can instruct the terminals 402-404 which terminal is the Active Talker, which of the multicast groups 451-452 to send video conference data to, and which of the multicast groups 451-452 to monitor video conference data (e.g., to receive video conference data from).

For example, when the CCA device 408 determines that the second terminal 403 is the Active Talker based on the audio portion of the video conference data 441, the CCA device 408 may send the message 470 instructing the second terminal 403 to monitor the first multicast group 451 of the first terminal 402 (e.g., the Previous Talker) and instructing the third terminal 404 to monitor the second multicast group 452 associated with the second terminal 403 (e.g., the Active Talker).

Thus, by using the CCA 408 and the multicast groups 451-454, a centralized video conferencing bridge may not be required for video conferencing calls. In addition, bandwidth requirements can be reduced by multicasting the video conference data. Thus, using multicasting to deliver video conference data of a video conference call between three or more terminals may result in a significant decrease in the amount of bandwidth used on the network (driving down the cost to deliver the service) as well as a reduction in latency for video conference calls.

Figure 5:
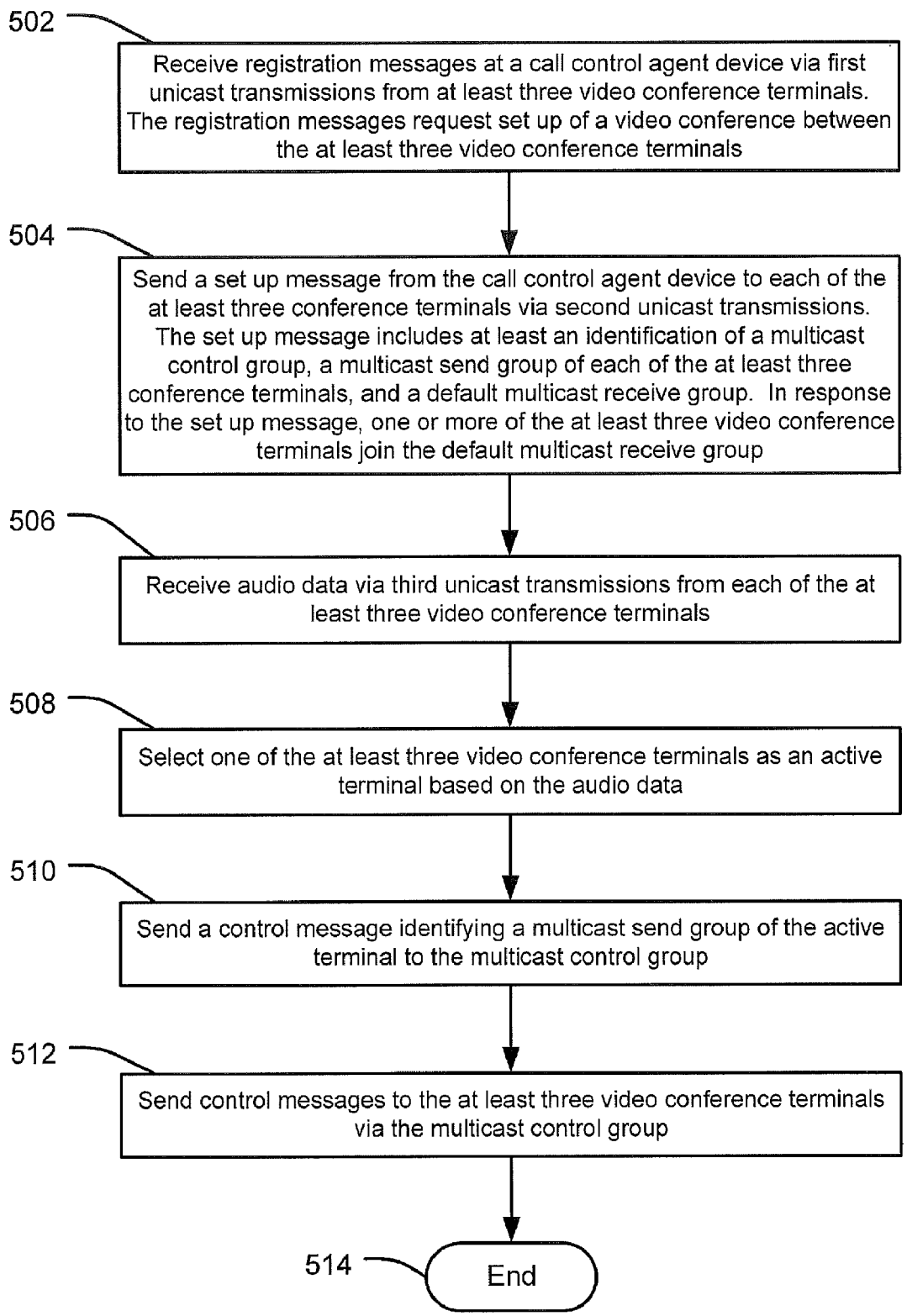
FIG. 5 is a flow diagram of a first particular embodiment of a method to set up a video conference using multicast and unicast transmissions.

FIG. 5 is a flow diagram of a first particular embodiment of a method to set up a video conference using multicast and unicast transmissions. The method may be performed by a Call Control Agent (CCA), such as the CCA 108 of FIG. 1, FIG. 2, FIG. 3, or the CCA device 408 of FIG. 4.

Registration messages are received at a call control agent device via first unicast transmissions from at least three video conference terminals, at 502. The registration messages request set up of a video conference between the at least three video conference terminals. Moving to 504, a set up message is sent from the call control agent device to each of the at least three conference terminals via second unicast transmissions. The set up message include at least an identification of a multicast control group, a send multicast group of each of the at least three conference terminals, and a default receive multicast group. In response to the set up message, one or more of the at least three video conference terminals join the default receive multicast group to receive video conference data. For example, in FIG. 4, the terminals 402-404 send the registrations messages 420-422 via unicast transmissions to the CCA device 408. The CCA device 408 sends set up control messages 430-432 via unicast transmissions to the terminals 402-404. In response to receiving the control messages 430-432 from the CCA device 408, at least one of the terminals 402-404 joins the multicast control group 454. Additionally, at least one of the terminals 402-404 joins the first multicast group as the default multicast group to monitor (e.g., receive video conference data from).

Advancing to 506, audio data may be received via third unicast transmissions from each of the at least three video conference terminals. Proceeding to 508, one of the at least three video conference terminals may be selected as an active terminal based on the audio data. Continuing to 510, a control message identifying a send multicast group of the active terminal may be sent to the multicast control group. Moving to 512, control messages may be sent to the at least three video conference terminals via the multicast control group. For example, in FIG. 4, the CCA device 408 monitors the audio data 440-442 and selects one of the terminals 402-404 as the active terminal (e.g., the Active Talker). The CCA device 408 may send the control message 470 to the terminals 402-404 via the multicast control group 454. The method ends at 514.

Thus, by using a CCA and multicast groups, a centralized video conferencing bridge may not be required for video conferencing calls. In addition, bandwidth requirements can be reduced by multicasting the video conference data. Thus, using multicasting to deliver video conference data of a video conference call between three or more terminals may result in a significant decrease in the amount of bandwidth used on the network (driving down the cost to deliver the service) as well as a reduction in latency for video conference calls.

Figure 6:
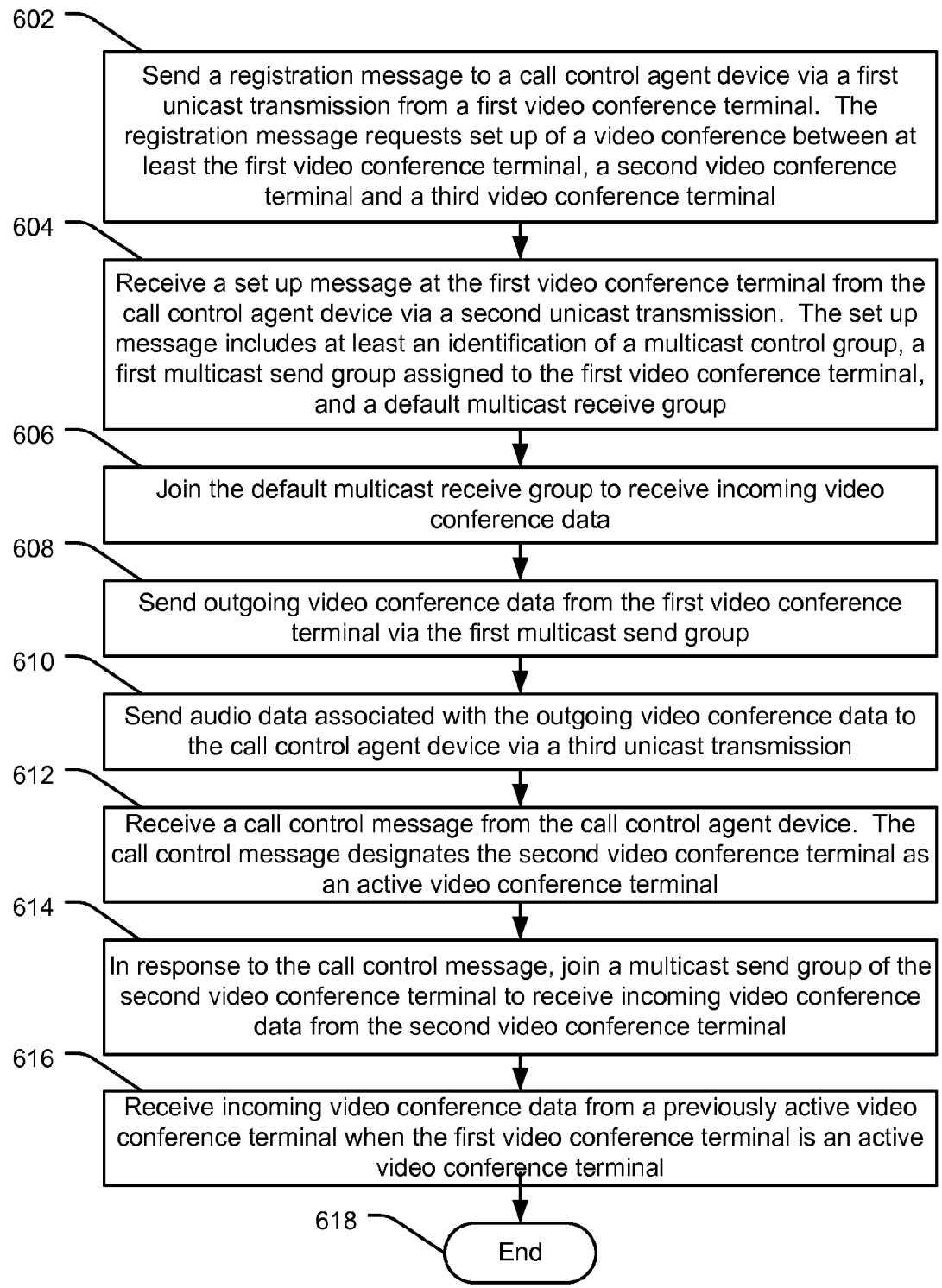
FIG. 6 is a flow diagram of a second particular embodiment of a method to set up a video conference using multicast and unicast transmissions.

FIG. 6 is a flow diagram of a second particular embodiment of a method to set up a video conference using multicast and unicast transmissions. The method may be performed by a video conferencing terminal, such as the terminals 102-104 of FIGS. 1-3 or the terminals 402-404 of FIG. 4.

A registration message is sent to a call control agent device via a first unicast transmission from a first video conference terminal, at 602. The registration message requests set up of a video conference between at least the first video conference terminal, a second video conference terminal and a third video conference terminal. Moving to 604, a set up message is received at the first video conference terminal from the call control agent device via a second unicast transmission. The set up message includes at least an identification of a multicast control group, a first send multicast group assigned to the first video conference terminal, and a default receive multicast group. Proceeding to 606, the default receive multicast group is joined to receive incoming video conference data. Advancing to 608, outgoing video conference data is sent from the first video conference terminal via the first send multicast group. For example, in FIG. 4, the terminals 402-404 may send the registration control messages 420-422 requesting the CCA device 408 to set up a video conference call. The CCA device 408 may send set up messages 430-432 to the terminals 402-404. The set-up messages 430-432 may each identify the multicast control group 454, a send multicast group assigned to each terminal, and a default receive multicast group. In FIG. 4, the first multicast group 451 is assigned to the first terminal 402, the second multicast group 452 is assigned to the second terminal 404, and the third multicast group 453 is assigned to the third terminal 405. The second terminal 403 and the third terminal 404 are each assigned to monitor the first multicast group 451 (e.g., the default multicast group) to receive incoming video conference data from the first terminal 402 (e.g., the Active Talker).

Continuing to 610, audio data associated with the outgoing video conference data may be sent to the call control agent device via a third unicast transmission. Moving to 612, a call control message may be received from the call control agent device. The call control message may designate the second video conference terminal as an active video conference terminal. Proceeding to 614, in response to the call control message, a send multicast group of the second video conference terminal may be joined to receive incoming video conference data from the second video conference terminal. Advancing to 616, incoming video conference data may be received from a previously active video conference terminal when the first video conference terminal is an active video conference terminal. For example, in FIG. 4, when the CCA device 408 determines that the second terminal 403 is the Active Talker based on the audio portion of the video conference data 441, the CCA device 408 may send the message 470 instructing the second terminal 403 to monitor the first multicast group 451 of the first terminal 402 (e.g., the Previous Talker) and instructing the third terminal 404 to monitor the second multicast group 452 associated with the second terminal 403 (e.g., the Active Talker). The method ends at 618.

Thus, by using a CCA and multicast groups, a centralized video conferencing bridge may not be required for video conferencing calls. In addition, bandwidth requirements can be reduced by multicasting the video conference data. Thus, using multicasting to deliver video conference data of a video conference call between three or more terminals may result in a significant decrease in the amount of bandwidth used on the network (driving down the cost to deliver the service) as well as a reduction in latency for video conference calls.

Figure 7:
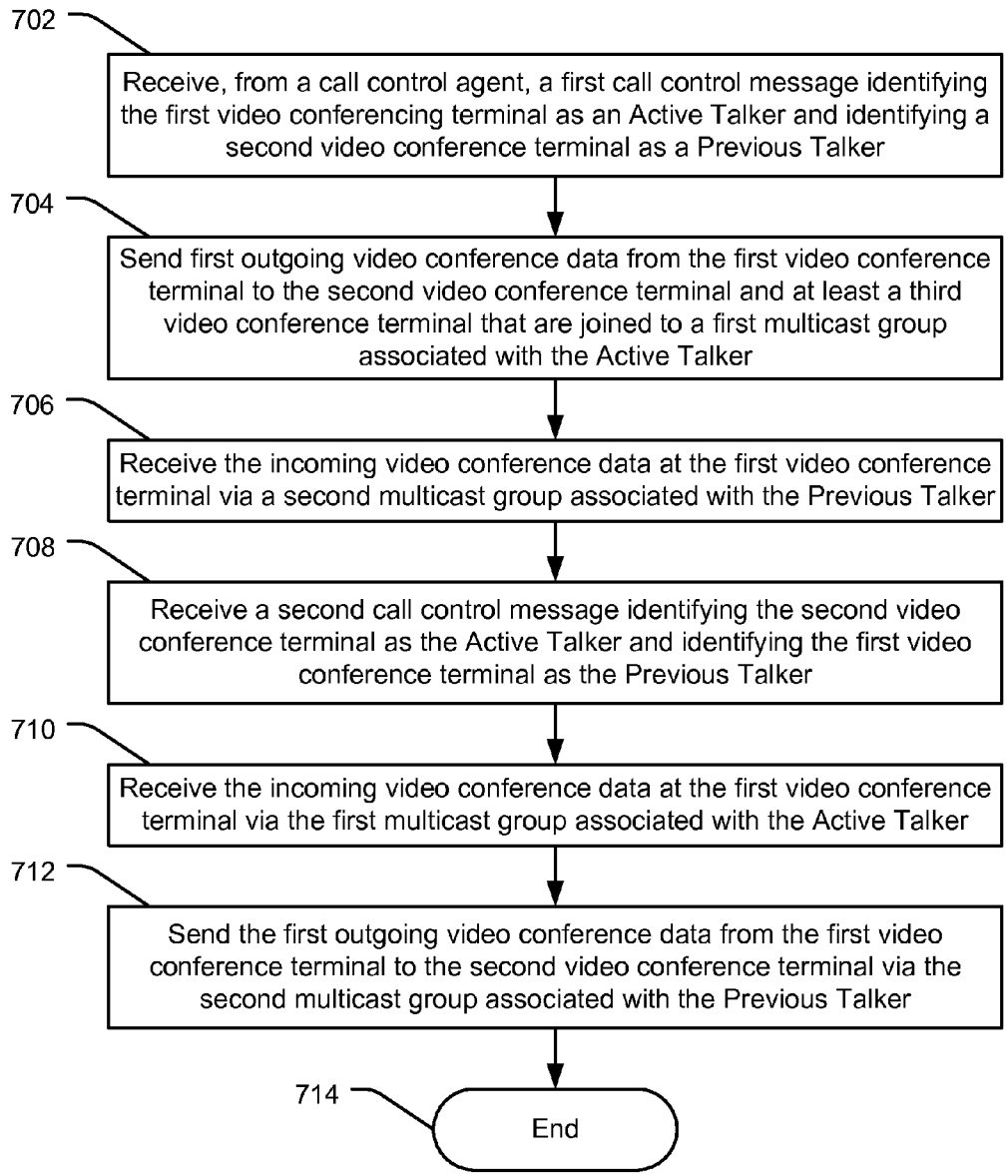
FIG. 7 is a flow diagram of a third particular embodiment of a method to set up a video conference using multicast and unicast transmissions.

FIG. 7 is a flow diagram of a third particular embodiment of a method to set up a video conference using multicast and unicast transmissions. The method may be performed by a video conferencing terminal, such as the terminals 102-104 of FIGS. 1-3 or the terminals 402-404 of FIG. 4.

A first call control message is received from a call control agent identifying the first video conferencing terminal as an Active Talker and identifying a second video conference terminal as a Previous Talker, at 702. Moving to 704, first outgoing video conference data is sent from the first video conference terminal to the second video conference terminal and at least a third video conference terminal that are joined to a first multicast group associated with the Active Talker. Proceeding to 706, incoming video conference data is received at the first video conference terminal via a second multicast group associated with the Previous Talker. For example, in FIG. 1, video conference data 150 is sent from the first terminal 102 to the terminals 103-104 via the first multicast group 110 associated with the Active Talker. The first terminal 102 receives video conference data 140 from the second terminal 403 via the second multicast group 111 associated with the Previous Talker.

Advancing to 708, a second call control message is received identifying the second video conference terminal as the Active Talker and identifying the first video conference terminal as the Previous Talker. Continuing to 710, the incoming video conference data is received at the first video conference terminal via the first multicast group associated with the Active Talker. Moving to 712, the first outgoing video conference data is sent from the first video conference terminal to the second video conference terminal via the second multicast group associated with the Previous Talker. For example, in FIG. 2, when the CCA 108 determines that the second terminal 103 is the active terminal (e.g., Active Talker) based on the audio portion of the video conference data 131, the CCA 108 may send a message via the control signal 120 instructing the first terminal 403 to monitor the first multicast group 110 associated with the Active Talker and instructing the first terminal 102 to send video conference data 240 to the second terminal 103 via the second multicast group 111 associated with the Previous Talker. The method ends at 710.

Thus, by using a CCA and multicast groups, a centralized video conferencing bridge may not be required for video conferencing calls. In addition, bandwidth requirements can be reduced by multicasting the video conference data. Thus, using multicasting to deliver video conference data of a video conference call between three or more terminals may result in a significant decrease in the amount of bandwidth used on the network (driving down the cost to deliver the service) as well as a reduction in latency for video conference calls.

Figure 8:
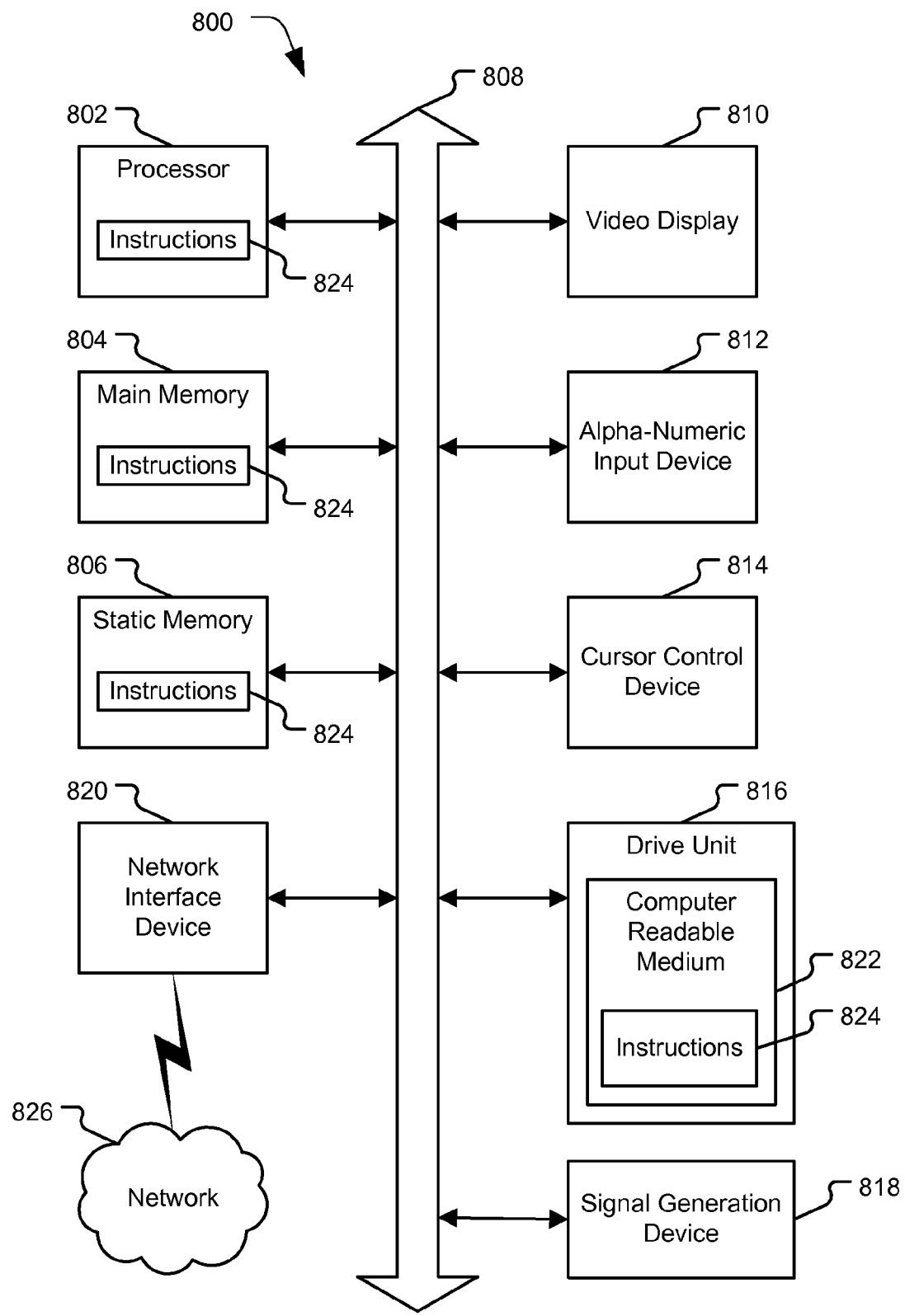
FIG. 8 is a block diagram of an illustrative embodiment of a general computer system.

Referring to FIG. 8, an illustrative embodiment of a general computer system is shown and is designated 800. The computer system 800 includes a set of instructions that can be executed to cause the computer system 800 to perform any one or more of the methods or computer based functions disclosed herein. The computer system 800, or any portion thereof, may operate as a standalone device or may be connected, e.g., using a network, to other computer systems or peripheral devices.

In a networked deployment, the computer system may operate in the capacity of a video conferencing terminal or a call control agent, such as the terminals 102-104 of FIGS. 1-3, the CCA 108 of FIGS. 1-3, the terminals 402-404 of FIG. 4, and the CCA device 408 of FIG. 4. The computer system 800 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 can include a main memory 804 and a static memory 806 that can communicate with each other via a bus 808. As shown, the computer system 800 may further include or be coupled to a video display unit 810, such as a liquid crystal display (LCD), an organic light emitting diode (OLED), a flat panel display, a cathode ray tube (CRT) display, a solid-state display, or a projection display. Additionally, the computer system 800 may include an input device 812, such as a keyboard, a remote control device, and a cursor control device 814, such as a mouse. The computer system 800 can also include a disk drive unit 816, a signal generation device 818, such as a speaker or remote control device, and a network interface device 820. The network interface device 820 may be coupled to other devices (not shown) via a network 826.

In a particular embodiment, as depicted in FIG. 8, the disk drive unit 816 may include a computer-readable medium 822 in which one or more sets of instructions 824, e.g., software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered equivalent to a tangible storage medium. Accordingly, the disclosure is considered to include any one or more of a computer-readable storage medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g., TCP/IP, UDP/IP, HTML, HTTP, and Internet Group Management Protocol (IGMP)) and standards for viewing media content (e.g., MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method, comprising:
receiving registration messages at a call control agent device via first unicast transmissions from video conference terminals, the registration messages requesting set up of a video conference between the video conference terminals, wherein the video conference terminals comprise at least three video conference terminals;
sending a set up message from the call control agent device to each of the video conference terminals via second unicast transmissions, wherein each set up message includes an identifier of a multicast control group that the video conference terminals are to join;
determining, at the call control agent device, an active terminal of the video conference terminals based on audio data received from the video conference terminals; and
sending a control message from the control agent device to the video conference terminals via the multicast control group in response to a determination that the active terminal has changed from a first video conference terminal to a second video conference terminal, wherein the control message enables the first video conference terminal to receive first video data via a first multicast group, wherein the control message enables the first video conference terminal to send second video data via a second multicast group, wherein the control message enables the second video conference terminal to send the first video data via the first multicast group, and wherein the control message enables the second video conference terminal to receive the second video data via the second multicast group.

2. The computer-implemented method of claim 1, further comprising receiving the audio data via third unicast transmissions from each of the video conference terminals.

3. The computer-implemented method of claim 1, wherein the set up message for a particular video conference terminal instructs the particular video conference terminal to receive active terminal video data via the first multicast group when the particular video conference terminal is not the active terminal.

4. The computer-implemented method of claim 1, wherein the set up message for a particular video conference terminal instructs the particular video conference terminal to send particular video conference terminal video data via the second multicast group when the particular video conference terminal is designated as a previous active terminal by the call control agent device.

5. The computer-implemented method of claim 1, wherein the set up message for a particular video conference terminal instructs the particular video conference terminal to send particular video conference terminal video data to the first multicast group when the call control agent device designates the particular video conference terminal as the active terminal.

6. The computer-implemented method of claim 5, wherein the set up message for the particular video conference terminal instructs the particular video conference terminal to receive previous active terminal video data sent via the second multicast group.

7. The computer-implemented method of claim 1, wherein the set up message for a particular video conference terminal instructs the particular video conference terminal to not send particular video conference terminal video data when the call control agent designates other video conference terminals as the active terminal and as a previous active terminal.

8. The computer-implemented method of claim 1, wherein, in response to the set up message, the video conference terminals monitor the multicast control group.

9. The computer-implemented method of claim 1, wherein the call control agent device receives a particular registration message from a particular video conference terminal before receiving registration messages from other video conference terminals, and wherein the call control agent designates the particular video conference terminal as an initial active terminal.

10. A computer-readable storage device comprising operational instructions that, when executed by a processor, cause the processor to:
   send a registration message to a call control agent device via a first unicast transmission;
   receive a set up message in response to the registration message from the call control agent device via a second unicast transmission, the set up message including an identification of a multicast control group and an identification of a first multicast group to provide incoming video conference data;
   join the multicast control group;
   join the first multicast group to receive incoming video conference data;
   receive a control message via the multicast control group; and
   change from receiving the incoming video conference data via the first multicast group to receiving the incoming video conference data via a second multicast group when content of the message indicates that the processor is to receive the incoming video conference data via the second multicast group.

11. The computer-readable storage device of claim 10, wherein the operational instructions are further executable by the processor to send audio data associated with outgoing video conference data to the call control agent device via a third unicast transmission.

12. The computer-readable storage device of claim 10, wherein the set up message includes an identification of the second multicast group to receive outgoing video conference data, and wherein the operational instructions are further executable by the processor to send the outgoing video conference data to the second multicast group.

13. The computer-readable storage device of claim 12, wherein the operational instructions are further executable by the processor to change from sending the outgoing video conference data via the second multicast group to one of sending the outgoing video conference data via the first multicast group and not sending the outgoing video conference data based on an identifier in the control message when receiving the incoming video conference data is changed from the first multicast group to the second multicast group.

14. The computer-readable storage device of claim 10, wherein the set up message includes an identification that enables the processor to not send outgoing video conference data.

15. A first video conference terminal, comprising:
   a processor; and
   a memory including operational instructions that, when executed by the processor, cause the processor to:
      receive, from a call control agent, a first call control message identifying the first video conference terminal as an active talker and identifying a second video conference terminal as a previous talker;
      send first outgoing video conference data from the first video conference terminal to the second video conference terminal and at least a third video conference terminal that are joined to a first multicast group associated with the active talker; and
      receive incoming video conference data at the first video conference terminal via a second multicast group associated with the previous talker.

16. The first video conference terminal of claim 15, wherein the operational instructions are further executable by the processor to receive a second call control message identifying the second video conference terminal as the active talker and identifying the first video conference terminal as the previous talker.

17. The first video conference terminal of claim 16, wherein, in response to the second call control message, the operational instructions are further executable by the processor to receive the incoming video conference data at the first video conference terminal via the first multicast group associated with the active talker.

18. The first video conference terminal of claim 16, wherein, in response to the second call control message, the operational instructions are further executable by the processor to send the first outgoing video conference data from the first video conference terminal to the second video conference terminal via the second multicast group associated with the previous talker.

19. The first video conference terminal of claim 16, wherein, in response to the second call control message, the second video conference terminal sends second outgoing video conference data from the second video conference terminal to at least the first video conference terminal and the third video conference terminal that are joined to the first multicast group associated with the active talker.

20. The first video conference terminal of claim 16, wherein, in response to the second call control message, the second video conference terminal receives second incoming video conference data at the second video conference terminal via the second multicast group associated with the previous talker.

* * * * *